(12) United States Patent
Huang et al.

(10) Patent No.: US 9,749,038 B2
(45) Date of Patent: Aug. 29, 2017

(54) SYSTEM AND METHOD FOR WIRELESS DOCKING UTILIZING A WIRELESS DOCKING PROFILE

(71) Applicant: QUALCOMM Incorporated, San Diego, CA (US)

(72) Inventors: Xiaolong Huang, San Diego, CA (US); Rolf de Vegt, San Jose, CA (US); Vijayalakshmi R. Raveendran, San Diego, CA (US); Jeffree S. Froelicher, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 708 days.

(21) Appl. No.: 13/740,595

(22) Filed: Jan. 14, 2013

(65) Prior Publication Data

US 2013/0311693 A1 Nov. 21, 2013

Related U.S. Application Data

(60) Provisional application No. 61/649,863, filed on May 21, 2012, provisional application No. 61/651,991, (Continued)

(51) Int. Cl.
*G06F 13/00* (2006.01)
*H04B 7/26* (2006.01)
(Continued)

(52) U.S. Cl.
CPC .............. *H04B 7/26* (2013.01); *G06F 1/1632* (2013.01); *G06F 13/00* (2013.01);
(Continued)

(58) Field of Classification Search
CPC ................. G06F 1/1632; G06F 1/1626; G06F 2213/0016; G06F 9/4411; G06F 13/387;
(Continued)

(56) References Cited

U.S. PATENT DOCUMENTS 6,170,026 B1 * 1/2001 Kimura et al. ................. 710/62
6,282,590 B1 * 8/2001 Ellis et al. ...................... 710/63
(Continued)

FOREIGN PATENT DOCUMENTS

CN 1581823 A 2/2005
CN 1662913 A 8/2005
(Continued)

OTHER PUBLICATIONS

Miller, et al., "Home Networking with Universal Plug and Play," IEEE Communications Magazine, Dec. 2001, pp. 104-109.
(Continued)

*Primary Examiner* — Brian Misiura
*Assistant Examiner* — Kim T. Huynh
(74) *Attorney, Agent, or Firm* — Paul Kuo

(57) ABSTRACT

Various aspects of the present disclosure provide the concept of a wireless docking profile, which may be standardized across a number of vendors, such that a common standard defining minimum sets of peripherals can be shared by dockees and docking hosts to simplify connection setup and negotiation. Further aspects of the disclosure provide a docking procedure that may be utilized to establish a docking connection between the dockee and the docking host to utilize such a docking profile. Other aspects, embodiments, and features are also claimed and described.

29 Claims, 9 Drawing Sheets

Related U.S. Application Data filed on May 25, 2012, provisional application No. 61/658,352, filed on Jun. 11, 2012, provisional application No. 61/658,363, filed on Jun. 11, 2012.

(51) Int. Cl.

| | | |
|---|---|---|
| *G06F 13/40* | (2006.01) | |
| *G06F 1/16* | (2006.01) | |
| *H04M 1/723* | (2006.01) | |
| *H04M 1/725* | (2006.01) | |

(52) U.S. Cl.
CPC ........ *G06F 13/4068* (2013.01); *H04M 1/723* (2013.01); *H04M 1/7253* (2013.01)

(58) Field of Classification Search
CPC .............. G06F 13/385; G06F 17/3008; H04N 2001/0058
USPC ................................ 710/303, 304, 313, 200
See application file for complete search history.

(56) References Cited

U.S. PATENT DOCUMENTS

| | | | |
|---|---|---|---|
| 6,590,588 B2 | 7/2003 | Lincke et al. | |
| 7,213,047 B2 | 5/2007 | Yeager et | |
| 7,349,117 B2 | 3/2008 | Stavely et al. | |
| 7,577,834 B1 | 8/2009 | Traversat et al. | |
| 7,590,075 B2 | 9/2009 | Pirzada et al. | |
| 7,954,150 B2 | 5/2011 | Croft et al. | |
| 8,036,600 B2 | 10/2011 | Garrett et al. | |
| 8,200,868 B1 | 6/2012 | 'T Hooft | |
| 8,254,992 B1 | 8/2012 | Ashenbrenner et al. | |
| 8,464,061 B2 | 6/2013 | Bradley | |
| 8,472,436 B2 * | 6/2013 | Meiri et al. | 370/386 |
| 8,566,498 B2 * | 10/2013 | Lemarchand et al. | 710/303 |
| 2002/0169977 A1 * | 11/2002 | Chmaytelli | 713/200 |
| 2006/0233191 A1 * | 10/2006 | Pirzada et al. | 370/463 |
| 2007/0274270 A1 | 11/2007 | Jones et al. | |
| 2008/0195788 A1 | 8/2008 | Tamir et al. | |
| 2008/0285626 A1 | 11/2008 | Claus et al. | |
| 2008/0287062 A1 | 11/2008 | Claus et al. | |
| 2008/0320587 A1 | 12/2008 | Vauclair et al. | |
| 2009/0073945 A1 | 3/2009 | Seok | |
| 2011/0034127 A1 | 2/2011 | Wentink et al. | |
| 2011/0081860 A1 | 4/2011 | Brown et al. | |
| 2011/0082939 A1 | 4/2011 | Montemurro et al. | |
| 2011/0082940 A1 | 4/2011 | Montemurro et al. | |
| 2011/0162035 A1 * | 6/2011 | King et al. | 726/1 |
| 2011/0188391 A1 | 8/2011 | Sella et al. | |
| 2011/0199989 A1 | 8/2011 | Wietfeldt et al. | |
| 2011/0205351 A1 | 8/2011 | Nakamura et al. | |
| 2011/0276698 A1 | 11/2011 | Bigioi et al. | |
| 2011/0320535 A1 | 12/2011 | Donaldson | |
| 2012/0015604 A1 | 1/2012 | Abratowski et al. | |
| 2012/0064829 A1 | 3/2012 | Hart et al. | |
| 2012/0099566 A1 * | 4/2012 | Laine et al. | 370/338 |
| 2012/0115453 A1 | 5/2012 | Zheng | |
| 2012/0120892 A1 | 5/2012 | Freda et al. | |
| 2012/0120934 A1 | 5/2012 | Cho | |
| 2012/0158839 A1 | 6/2012 | Hassan et al. | |
| 2012/0265913 A1 * | 10/2012 | Suumaki et al. | 710/303 |
| 2012/0304280 A1 * | 11/2012 | Hayashida | 726/16 |
| 2013/0029596 A1 | 1/2013 | Preston et al. | |
| 2013/0086633 A1 | 4/2013 | Schultz | |
| 2013/0091211 A1 | 4/2013 | Diab et al. | |
| 2013/0095753 A1 | 4/2013 | Chen | |
| 2013/0132613 A1 | 5/2013 | Chassot et al. | |
| 2013/0189925 A1 | 7/2013 | Staskawicz et al. | |
| 2013/0204962 A1 | 8/2013 | Estevez et al. | |
| 2013/0205032 A1 | 8/2013 | Polefko | |
| 2013/0279698 A1 | 10/2013 | Bradley | |
| 2013/0282932 A1 | 10/2013 | Robert et al. | |
| 2013/0304959 A1 * | 11/2013 | Chiang | 710/303 |
| 2013/0309973 A1 | 11/2013 | Raveendran et al. | |
| 2013/0311692 A1 | 11/2013 | Huang et al. | |
| 2013/0311694 A1 | 11/2013 | Bhamidipati et al. | |
| 2014/0201415 A1 * | 7/2014 | Huang et al. | 710/303 |
| 2014/0289396 A1 | 9/2014 | Navasivasakthivelsamy et al. | |
| 2014/0289422 A1 | 9/2014 | Singh et al. | |
| 2015/0016417 A1 | 1/2015 | Dees et al. | |
| 2015/0100715 A1 * | 4/2015 | Huang et al. | 710/303 |

FOREIGN PATENT DOCUMENTS

| | | |
|---|---|---|
| CN | 101015173 A | 8/2007 |
| CN | 101536476 A | 9/2009 |
| JP | 2002359873 A | 12/2002 |
| JP | 2002368759 A | 12/2002 |
| JP | 2006067174 A | 3/2006 |
| JP | 2009060163 A | 3/2009 |
| JP | 2011114377 A | 6/2011 |
| WO | 2011019595 | 2/2011 |
| WO | 2011039718 A1 | 4/2011 |
| WO | 2011039719 A1 | 4/2011 |
| WO | 2011056878 A1 | 5/2011 |

OTHER PUBLICATIONS

International Search Report and Written Opinion—PCT/US2013/030979—ISA/EPO—Jun. 7, 2013.

* cited by examiner

Desktop Profile

| Device Class | Peripheral Function (PF) | Payload Connection Protocol (PCP) | Dock Interfaces |
|---|---|---|---|
| Peripherals | | | |
| Display | | | |
| Monitor | WFD | WiFi (2.4/5 GHz) | HDMI |
|  | WFD | WiGig (60 GHz) | VGA (or DVI) |
|  |  |  | Embedded |
| Human Input | | | |
|  | WFD | WiFi (2.4/5 GHz) | USB (HID) |
| Mouse | WSB | WiGig (60 GHz) | Bluetooth (HID) |
| Keyboard | HID | Bluetooth (2.4 GHz) |  |
| Gamepad | | | |
| Audio | WFD | WiFi (2.4/5 GHz) | 3.5mm Audio Jacks |
| Speakers | RTP | WiGig (60 GHz) | Embedded |
| Mic/Headset | A2DP or HFP | Bluetooth (2.4 GHz) | Bluetooth Headset |
| Mass Storage | SMB/IP | WiFi (2.4/5 GHz) | USB (MSC) |
| Any (Flash Drive, Hard Drive, DSC, Phone) | WSB | WiGig (60 GHz) |  |
| Other USB | WSB | WiFi (2.4/5 GHz) | USB |
| Printer |  | WiGig (60 GHz) |  |
| Networked | SMB/IP | WiFi (2.4/5 GHz) | WLAN |
| Printer | RTSP | WiGig (60 GHz) |  |
| IP Cam, Media Server | | | |
| Internet | IP | WiFi (2.4/5 GHz) | Ethernet |
|  |  | WiGig (60 GHz) | Wi-Fi, Mobile |

FIG. 4

Automotive Profile

| Device Class | Peripheral Function (PF) | Payload Connection Protocol (PCP) | Dock Interfaces |
|---|---|---|---|
| Peripherals | | | |
| Display | WFD | WiFi (2.4/5 GHz) | Embedded |
| Dash Touchscreen | | WiGig (60 GHz) | HDMI |
| Input Controls | WFD | WiFi (2.4/5 GHz) | USB (HID) |
| Touchscreen | WSB | WiGig (60 GHz) | Bluetooth (HID) |
| OBU Controls | HID | Bluetooth (2.4 GHz) | |
| Console Buttons | | | |
| Audio | WFD | WiFi (2.4/5 GHz) | 3.5mm Audio Jacks |
| Speakers | RTP | WiGig (60 GHz) | Embedded |
| Mic/Headset | A2DP or HFP | Bluetooth (2.4 GHz) | Bluetooth Headset |
| Mass Storage | SMB/IP | WiFi (2.4/5 GHz) | USB (MSC) |
| Any (Flash Drive, Hard Drive, DSC, Phone) | WSB | WiGig (60 GHz) | USB |
| Serial Devices | WSB | WiFi (2.4/5 GHz) | Bluetooth |
| Sensors/Meters (OBD-II+) | SPP | WiGig (60 GHz) | Embedded |
| Cameras | | Bluetooth (2.4 GHz) | |
| Other USB | | | |
| Networked | SMB/IP | WiFi (2.4/5 GHz) | WLAN |
| IP Cameras | RTSP | WiGig (60 GHz) | |
| Media Server | | | |
| Internet | IP | WiFi (2.4/5 GHz) | Ethernet |
| | | WiGig (60 GHz) | Wi-Fi, Mobile |

FIG. 5

Collaboration Profile

| Device Class | Peripheral Function (PF) | Payload Connection Protocol (PCP) | Dock Interfaces |
|---|---|---|---|
| Peripherals | | | |
| Display | WFD | WiFi (2.4/5 GHz) | VGA (or DVI) |
| Projector | | WiGig (60 GHz) | HDMI |
| Large Shared Monitor | | | Embedded |
| Web Feed | | | |
| Human Input | WFD | WiFi (2.4/5 GHz) | USB (HID) |
| Multi Mouse | WSB | WiGig (60 GHz) | Bluetooth (HID) |
| Multi Keyboard | HID | Bluetooth (2.4 GHz) | |
| Other controllers | | | |
| Audio | WFD | WiFi (2.4/5 GHz) | 3.5mm Audio Jacks |
| Speakers | RTP | WiGig (60 GHz) | Embedded |
| Multi Mics/Headsets | A2DP or HFP | Bluetooth (2.4 GHz) | Bluetooth Headset |
| Video | RTP/IP | WiFi (2.4/5 GHz) | Embedded |
| VTC, Telepresence | WSB | WiGig (60 GHz) | Networked |
| Security Camera | | | Video Connectors |
| Other USB | WSB | WiFi (2.4/5 GHz) | USB |
| Serial Devices | | WiGig (60 GHz) | |
| Networked | SMB/IP | WiFi (2.4/5 GHz) | WLAN |
| IP Cams, Webcams | RTSP | WiGig (60 GHz) | |
| Media Server | | | |
| Internet | IP | WiFi (2.4/5 GHz) | Ethernet |
| | | WiGig (60 GHz) | Wi-Fi, Mobile |

*FIG. 6*

Entertainment Profile

| Device Class | Peripheral Function (PF) | Payload Connection Protocol (PCP) | Dock Interfaces |
|---|---|---|---|
| Peripherals | | | |
| Display | | | |
| Television/Monitor | WFD | WiFi (2.4/5 GHz) | HDMI |
| | WFD | WiGig (60 GHz) | Embedded |
| Human Input | | | |
| Remote Control | WSB | WiGig (60 GHz) | USB (HID) |
| Gamepad | HID | Bluetooth (2.4 GHz) | Bluetooth (HID) |
| Mouse/Keyboard | | | |
| Audio | | | |
| | WFD | WiFi (2.4/5 GHz) | 3.5mm Audio Jacks |
| Speakers | RTP | WiGig (60 GHz) | Digital Audio / 5.1 |
| Mic/Headset | A2DP or HFP | Bluetooth (2.4 GHz) | Embedded |
| Mass Storage | | | |
| Any (Flash Drive, Hard Drive, DSC, Phone) | SMB/IP | WiFi (2.4/5 GHz) | USB (MSC) |
| | WSB | WiGig (60 GHz) | |
| Video | | | |
| | WSB | WiFi (2.4/5 GHz) | HDMI/Composite |
| DSC, Video Cameras | RTP | WiGig (60 GHz) | USB (MTP or ISO) |
| Other USB | | | |
| Serial Devices | WSB | WiFi (2.4/5 GHz) | USB |
| | | WiGig (60 GHz) | |
| Networked | | | |
| | SMB/IP | WiFi (2.4/5 GHz) | WLAN |
| Streaming Video | DLNA/IP | WiGig (60 GHz) | |
| IP Cam, Media Server | RTSP/IP | | |
| Internet | IP | WiFi (2.4/5 GHz) | Ethernet |
| | | WiGig (60 GHz) | Wi-Fi, Mobile |

*FIG. 7*

M2M Profile

| Device Class | Peripheral Function (PF) | Payload Connection Protocol (PCP) | Dock Interfaces |
|---|---|---|---|
| Peripherals | | | |
| Display | WFD | WiFi (2.4/5 GHz) | HDMI |
| Monitor | | WiGig (60 GHz) | VGA (or DVI) |
| | | | Embedded |
| Human Input | WFD | WiFi (2.4/5 GHz) | USB (HID) |
| Mouse | WSB | WiGig (60 GHz) | Bluetooth (HID) |
| Keyboard | HID | Bluetooth (2.4 GHz) | |
| Control Pad | | | |
| Sensors | WSB | WiFi (2.4/5 GHz) | Relays |
| Any (On/Off, Meters, Appliances, Motion Detection, Lighting, etc.) Home Automation Devices | SPP/BT | WiGig (60 GHz) | Embedded |
| | | | Bluetooth 4.0 (2.4 GHz) |
| | | | Zigbee/802.15.4 (2.4 GHz) |
| Mass Storage | SMB/IP | WiFi (2.4/5 GHz) | USB (MSC) |
| Any (Flash Drive, Hard Drive, DSC, Phone) | WSB | WiGig (60 GHz) | |
| Other USB | WSB | WiFi (2.4/5 GHz) | USB |
| Custom Serial Devices | | WiGig (60 GHz) | |
| Networked | SMB/IP | WiFi (2.4/5 GHz) | WLAN |
| IP Cam, Device Manager | RTSP | WiGig (60 GHz) | |
| Internet | IP | WiFi (2.4/5 GHz) | Ethernet |
| | | WiGig (60 GHz) | Wi-Fi, Mobile |

*FIG. 8*

SYSTEM AND METHOD FOR WIRELESS DOCKING UTILIZING A WIRELESS DOCKING PROFILE

CROSS-REFERENCE TO RELATED APPLICATIONS

This application claims priority to and the benefit of provisional patent application No. 61/649,863, titled "SYSTEM AND METHOD FOR WIRELESS DOCKING UTILIZING A WIRELESS DOCKING PROFILE" and filed in the United States Patent and Trademark Office on May 21, 2012; provisional patent application No. 61/651,991, titled "APPARATUS AND METHOD FOR PERSISTENT WIRELESS DOCKING" and filed in the United States Patent and Trademark Office on May 25, 2012; provisional patent application No. 61/658,352, titled "APPARATUS AND METHOD FOR DIRECT PAIRING IN A WIRELESS DOCKING SYSTEM" and filed in the United States Patent and Trademark Office on Jun. 11, 2012; and provisional patent application No. 61/658,363, titled "APPARATUS AND METHOD FOR WIRELESS DOCKING UTILIZING A WIRELESS DOCKING PROFILE IN THE PRESENCE OF WIRELESS DOCKING ENVIRONMENTS" and filed in the United States Patent and Trademark Office on Jun. 11, 2012, the entire contents of which are incorporated herein by reference.

TECHNICAL FIELD

Aspects of the present disclosure relate generally to wireless docking systems, and more particularly, to systems and methods of establishing a wireless docking session between a docking host and a dockee.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

Recent interest has been directed toward WLAN connectivity, where a dockee, e.g., a mobile device such as a cellular telephone, can utilize a WLAN interface (e.g., an IEEE 802.11 "Wi-Fi" interface) to establish wireless communication links with one or more peripheral devices. Here, peripheral devices can be any of numerous types, such as a mouse, keyboard, display, printer, camera, speakers, mass storage devices, media servers, sensors, and many others. Current docking procedures typically utilize a PIN code or pairing between the dockee and each peripheral device, including negotiation of the best link, protocol, and QoS for each peripheral connection.

As the demand for mobile broadband access continues to increase, research and development continue to advance wireless technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide the concept of a wireless docking profile, which may be standardized across a number of vendors, such that a common standard defining minimum sets of peripherals can be shared by dockees and docking hosts to simplify connection setup and negotiation. Further aspects of the present disclosure provide a docking procedure that may be utilized to establish a docking connection between the dockee and the docking host to utilize such a docking profile.

In one aspect, the disclosure provides a method operable at a docking host for docking with a dockee, including the steps of generating a list of peripherals available for communication with the docking host, determining one or more supported docking profiles capable of being supported by the list of peripherals, transmitting an indication of the one or more supported docking profiles to the dockee, and docking with the dockee to utilize a set of one or more peripherals communicatively coupled to the docking host corresponding to one of the supported docking profiles.

In another aspect, the disclosure provides a method operable at a docking host for docking with a dockee, including the steps of receiving, from the dockee, an indication of one or more requested docking profiles, each of the one or more docking profiles comprising a minimum set of peripherals corresponding to a pre-configured use case, comparing the one or more requested docking profiles to a list of one or more supported docking profiles, and docking with the dockee to utilize a set of one or more peripherals communicatively coupled to the docking host corresponding to one of the supported docking profiles.

In another aspect, the disclosure provides a method operable at a docking host for docking with a dockee, including the steps of receiving, from the dockee, an indication of one or more requested docking profiles, each of the one or more docking profiles comprising a minimum set of peripherals corresponding to a pre-configured use case, assembling a group of peripherals corresponding to one of the one or more requested docking profiles, and docking with the dockee to utilize a set of one or more peripherals communicatively coupled to the docking host corresponding to one of the supported docking profiles.

In another aspect, the disclosure provides a method operable at a docking host for docking with a dockee, including the steps of receiving, from the dockee, an indication of one or more requested docking profiles, each of the one or more requested docking profiles comprising a minimum set of peripherals corresponding to a pre-configured use case, determining that none of the one or more requested docking profiles are available for a docking session, and transmitting a list of one or more available peripherals to the dockee.

In another aspect, the disclosure provides a docking host configured for docking with a dockee, including means for generating a list of peripherals available for communication with the docking host, means for determining one or more supported docking profiles capable of being supported by the list of peripherals, means for transmitting an indication of the one or more supported docking profiles to the dockee, and means for docking with the dockee to utilize a set of one or more peripherals communicatively coupled to the docking host corresponding to one of the supported docking profiles.

In another aspect, the disclosure provides a docking host configured for docking with a dockee, including means for receiving, from the dockee, an indication of one or more requested docking profiles, each of the one or more docking profiles comprising a minimum set of peripherals corresponding to a pre-configured use case, means for comparing the one or more requested docking profiles to a list of one or more supported docking profiles, and means for docking with the dockee to utilize a set of one or more peripherals communicatively coupled to the docking host corresponding to one of the supported docking profiles.

In another aspect, the disclosure provides a docking host configured for docking with a dockee, including means for receiving, from the dockee, an indication of one or more requested docking profiles, each of the one or more docking profiles comprising a minimum set of peripherals corresponding to a pre-configured use case, means for assembling a group of peripherals corresponding to one of the one or more requested docking profiles, and means for docking with the dockee to utilize a set of one or more peripherals communicatively coupled to the docking host corresponding to one of the supported docking profiles.

In another aspect, the disclosure provides a docking host configured for docking with a dockee, including means for receiving, from the dockee, an indication of one or more requested docking profiles, each of the one or more requested docking profiles comprising a minimum set of peripherals corresponding to a pre-configured use case, means for determining that none of the one or more requested docking profiles are available for a docking session, and means for transmitting a list of one or more available peripherals to the dockee.

In another aspect, the disclosure provides a docking host configured for docking with a dockee, including at least one processor, a transceiver communicatively coupled to the at least one processor, and a memory communicatively coupled to the at least one processor, wherein the at least one processor if configured to generate a list of peripherals available for communication with the docking host, to determine one or more supported docking profiles capable of being supported by the list of peripherals, to transmit an indication of the one or more supported docking profiles to the dockee, and to dock with the dockee to utilize a set of one or more peripherals communicatively coupled to the docking host corresponding to one of the supported docking profiles.

In another aspect, the disclosure provides a docking host configured for docking with a dockee, including at least one processor, a transceiver communicatively coupled to the at least one processor, and a memory communicatively coupled to the at least one processor, wherein the at least one processor is configured to receive, from the dockee, an indication of one or more requested docking profiles, each of the one or more docking profiles comprising a minimum set of peripherals corresponding to a pre-configured use case, to compare the one or more requested docking profiles to a list of one or more supported docking profiles, and to dock with the dockee to utilize a set of one or more peripherals communicatively coupled to the docking host corresponding to one of the supported docking profiles.

In another aspect, the disclosure provides a docking host configured for docking with a dockee, including at least one processor, a transceiver communicatively coupled to the at least one processor, and a memory communicatively coupled to the at least one processor, wherein the at least one processor is configured to receive, from the dockee, an indication of one or more requested docking profiles, each of the one or more docking profiles comprising a minimum set of peripherals corresponding to a pre-configured use case, to assemble a group of peripherals corresponding to one of the one or more requested docking profiles, and to dock with the dockee to utilize a set of one or more peripherals communicatively coupled to the docking host corresponding to one of the supported docking profiles.

In another aspect, the disclosure provides a docking host configured for docking with a dockee, including at least one processor, a transceiver communicatively coupled to the at least one processor, and a memory communicatively coupled to the at least one processor, wherein the at least one processor is configured to receive, from the dockee, an indication of one or more requested docking profiles, each of the one or more requested docking profiles comprising a minimum set of peripherals corresponding to a pre-configured use case, to determine that none of the one or more requested docking profiles are available for a docking session, and to transmit a list of one or more available peripherals to the dockee.

In another aspect, the disclosure provides a computer-readable storage medium, comprising instructions for causing a computer to generate a list of peripherals available for communication with a docking host, to determine one or more supported docking profiles capable of being supported by the list of peripherals, to transmit an indication of the one or more supported docking profiles to the dockee, and to dock with the dockee to utilize a set of one or more peripherals communicatively coupled to the docking host corresponding to one of the supported docking profiles.

In another aspect, the disclosure provides a computer-readable storage medium, comprising instructions for causing a computer to receive, from a dockee, an indication of one or more requested docking profiles, each of the one or more docking profiles comprising a minimum set of peripherals corresponding to a pre-configured use case, to compare the one or more requested docking profiles to a list of one or more supported docking profiles, and to dock with the dockee to utilize a set of one or more peripherals communicatively coupled to a docking host corresponding to one of the supported docking profiles.

In another aspect, the disclosure provides a computer-readable storage medium, comprising instructions for causing a computer to receive, from a dockee, an indication of one or more requested docking profiles, each of the one or more docking profiles comprising a minimum set of peripherals corresponding to a pre-configured use case, to assemble a group of peripherals corresponding to one of the one or more requested docking profiles, and to dock with the dockee to utilize a set of one or more peripherals communicatively coupled to a docking host corresponding to one of the supported docking profiles.

In another aspect, the disclosure provides a computer-readable storage medium, comprising instructions for causing a computer to receive, from a dockee, an indication of one or more requested docking profiles, each of the one or more requested docking profiles comprising a minimum set of peripherals corresponding to a pre-configured use case, to determine that none of the one or more requested docking profiles are available for a docking session, and to transmit a list of one or more available peripherals to the dockee.

These and other aspects of the invention will become more fully understood upon a review of the detailed description, which follows.

BRIEF DESCRIPTION OF THE DRAWINGS

FIGS. 4-8 illustrate some examples of docking profiles according to some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
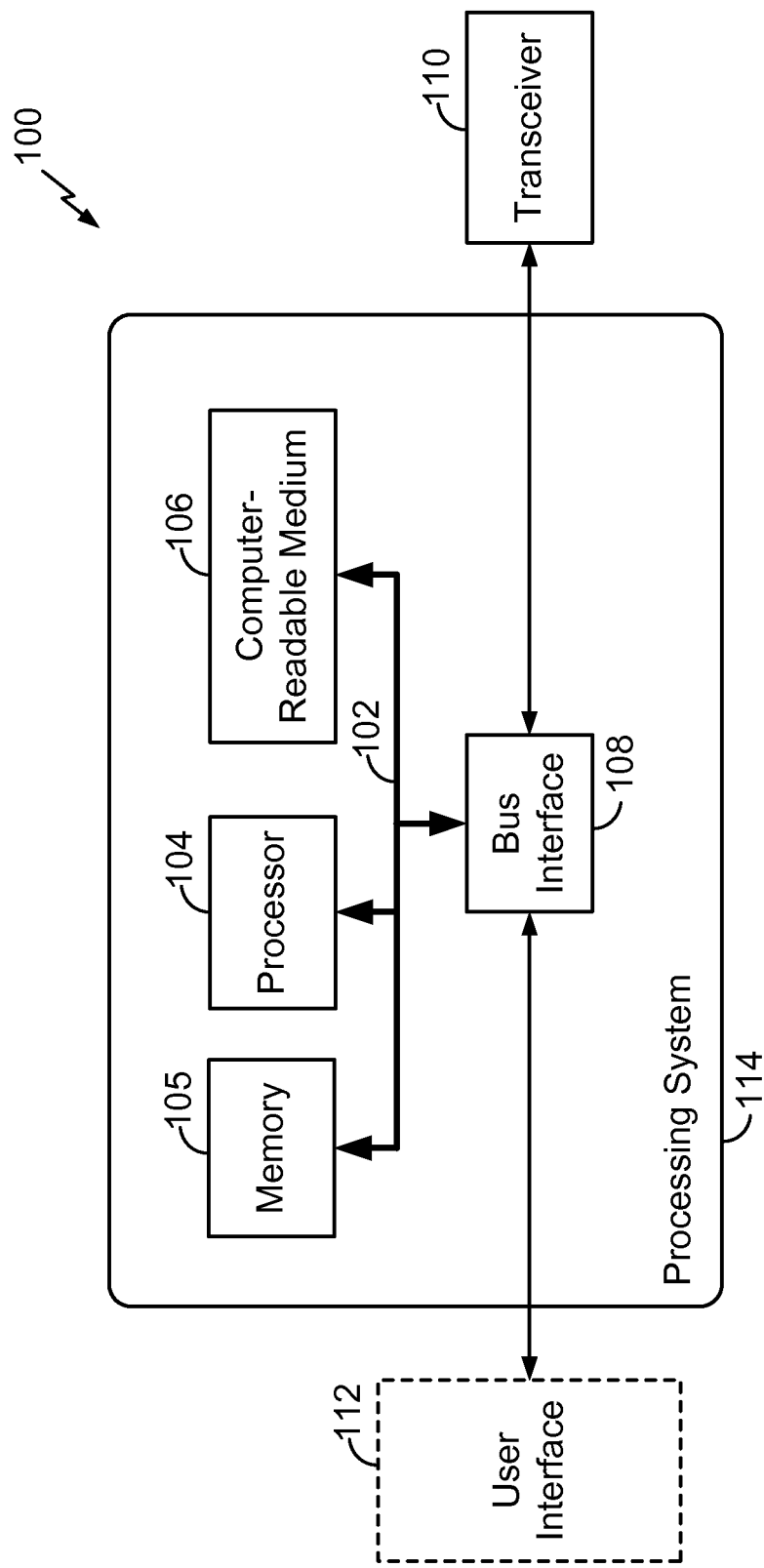
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the present disclosure, an element, or any portion of an element, or any combination of elements may be implemented with a processing system 114 that includes one or more processors 104. For example, in various aspects, the apparatus 100 may represent any one or more of a wireless dockee, a wireless docking host, and/or a peripheral device. Examples of processors 104 that may be utilized in an apparatus 100 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

One or more aspects of the disclosure relate to wireless docking systems. A wireless docking system can provide seamless connectivity, enabling a portable device such as a mobile handset, PDA, tablet computer, etc. to connect with a group of peripheral devices without needing wires or a docking connector, a PIN code or elaborate pairing process for between the dockee and each individual peripheral. The peripherals in any docking environment may act as a group, which needs only to be set up once. Many different types of peripherals may be supported in a docking environment, including the bridging of legacy peripherals. Ideally, the best link, protocol, and QoS would be automatically set up for each type of peripheral connection. The best connection may be selected depending on the application (e.g., for a productivity application, for watching videos, or for playing games, etc.), and the environment (e.g., the home enterprise, internet café, etc.). Here, existing application sessions/connections may be left intact.

Figure 2:
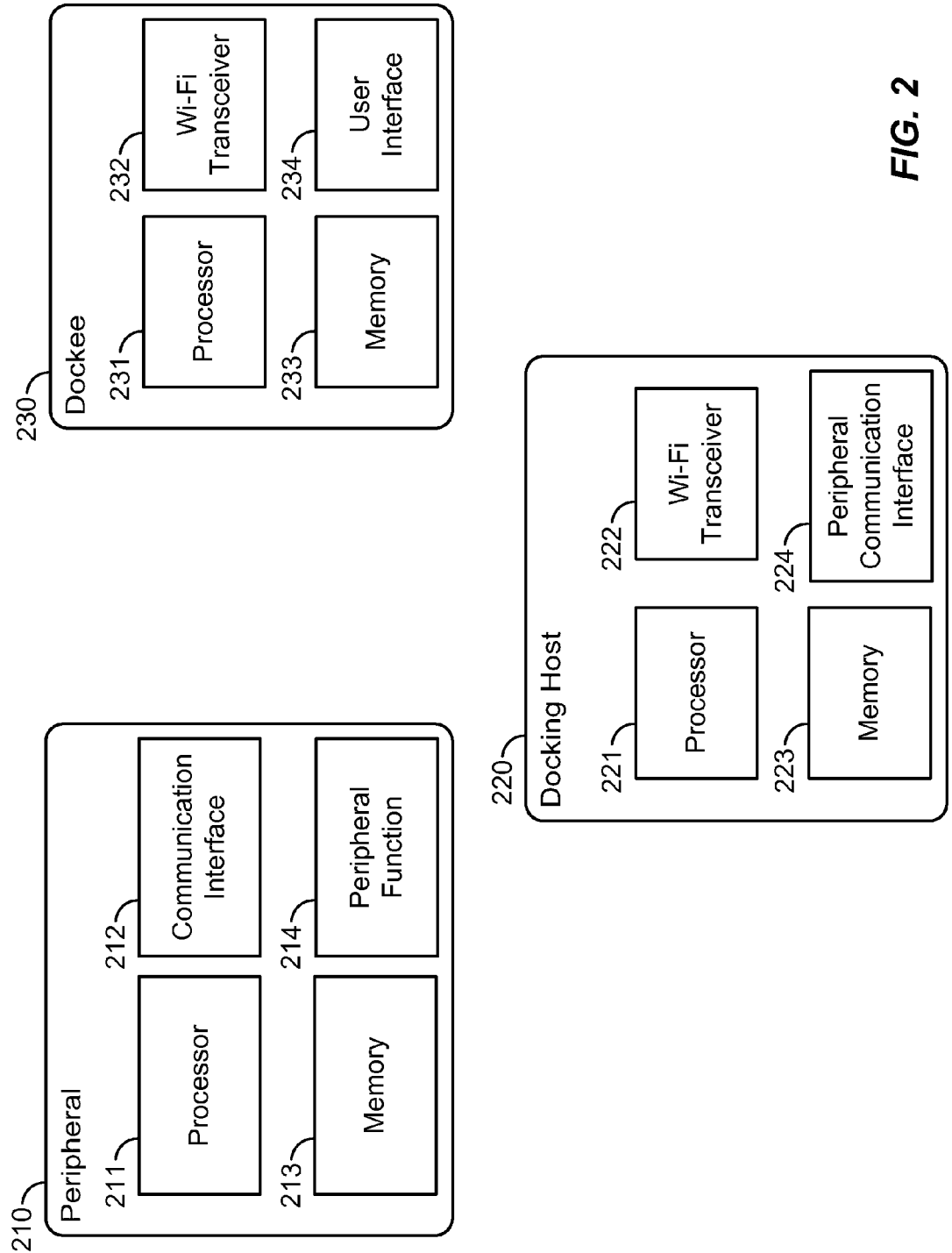
FIG. 2 is a simplified block diagram of a dockee, peripheral, and docking host as may be utilized for docking utilizing docking profiles according to one example.

FIG. 2 includes a simplified block diagram illustrating an exemplary peripheral 210, an exemplary docking host 220, and an exemplary dockee 230 in accordance with some aspects of the disclosure. In the illustrated example, the peripheral 210 includes at least one processor 211, a memory 213 communicatively coupled to the at least one processor 211, a communication interface 212 communicatively coupled to the at least one processor 211, and optional peripheral function circuitry 214. In some aspects of the disclosure, the at least one processor 211 may be the processor 104 included in the processing system 114 described above and illustrated in FIG. 1; similarly, the memory 213 may be the memory 105 described above and illustrated in FIG. 1.

In various aspects of the disclosure, the communication interface 212 may be a wired and/or wireless interface configured for communication with a docking host 220. For example, a wired communication interface 212 may include a USB interface, a PS/2 interface, a serial bus interface, or any other suitable wired communication interface. In another example, a wireless communication interface 212 may include a Wi-Fi interface compatible with any of the family of standards defined under the IEEE 802.11 standards, an IEEE 802.15.1 "Bluetooth" interface, an IEEE 802.15.4 "ZigBee" interface, or any other suitable wireless communication interface. Of course, some examples of a peripheral 210 may include two or more of the above-described or other communication interfaces. Further, when included in a peripheral 210, the peripheral function circuitry 214 may be embodied in any number of ways, including for example a user interface, a display, microphone, speaker, network interface, etc.

Further, in the illustrated example, the docking host 220 includes at least one processor 221, a Wi-Fi transceiver 222 communicatively coupled to the at least one processor 221, a memory 223 communicatively coupled to the at least one processor 221, and a peripheral communication interface 224 communicatively coupled to the at least one processor 221. In some aspects of the disclosure, the at least one processor 221 may be the processor 104 included in the processing system 114 described above and illustrated in FIG. 1; similarly, the memory 222 may be the memory 105 described above and illustrated in FIG. 1.

In various aspects of the disclosure, the Wi-Fi transceiver 222 may be a relatively high-bandwidth communication interface adapted for communication between the docking host 220 and the dockee 230. For example, the Wi-Fi transceiver 222 may be configured to utilize any of the various communication protocols defined by the IEEE 802.11 family of standards. Of course, these protocols are only one example, and within the scope of the disclosure, any suitable wireless communication protocol may be utilized for communication between the docking host 220 and the dockee 230.

In a further aspect of the disclosure, the docking host 220 may additionally include a peripheral communication interface 224. In some examples, the peripheral communication interface 224 may include an IEEE 802.15.1 "Bluetooth" interface, an IEEE 802.15.4 "ZigBee" interface, or any other suitable wireless communication interface. In some examples, the Wi-Fi transceiver 222 and the peripheral communication interface 224 may be one and the same component.

Still further, in the illustrated example, the dockee 230 includes at least one processor 231, a Wi-Fi transceiver 232 communicatively coupled to the at least one processor 231, a memory 233 communicatively coupled to the at least one processor 231, and a user interface 234 communicatively coupled to the at least one processor 231. In some aspects of the disclosure, the at least one processor 231 may be the processor 104 included in the processing system 114 described above and illustrated in FIG. 1; similarly, the memory 232 may be the memory 105 described above and illustrated in FIG. 1.

In various aspects of the disclosure, the Wi-Fi transceiver 232 may be a relatively high-bandwidth communication interface adapted for communication between the dockee 230 and the docking host 220. For example, the Wi-Fi transceiver 232 may be configured to utilize any of the various communication protocols defined by the IEEE 802.11 family of standards. Of course, these protocols are only one example, and within the scope of the disclosure, any suitable wireless communication protocol may be utilized for communication between the dockee 230 and the docking host 220.

In a further aspect of the disclosure, the dockee 230 may include a user interface 234 for input/output functionality enabling communication between a user and the wireless docking system. As an illustrative but non-limiting example, the dockee 230 may be embodied as a smartphone or tablet device, including a touch-screen interface providing user input and output functionality.

Figure 3:
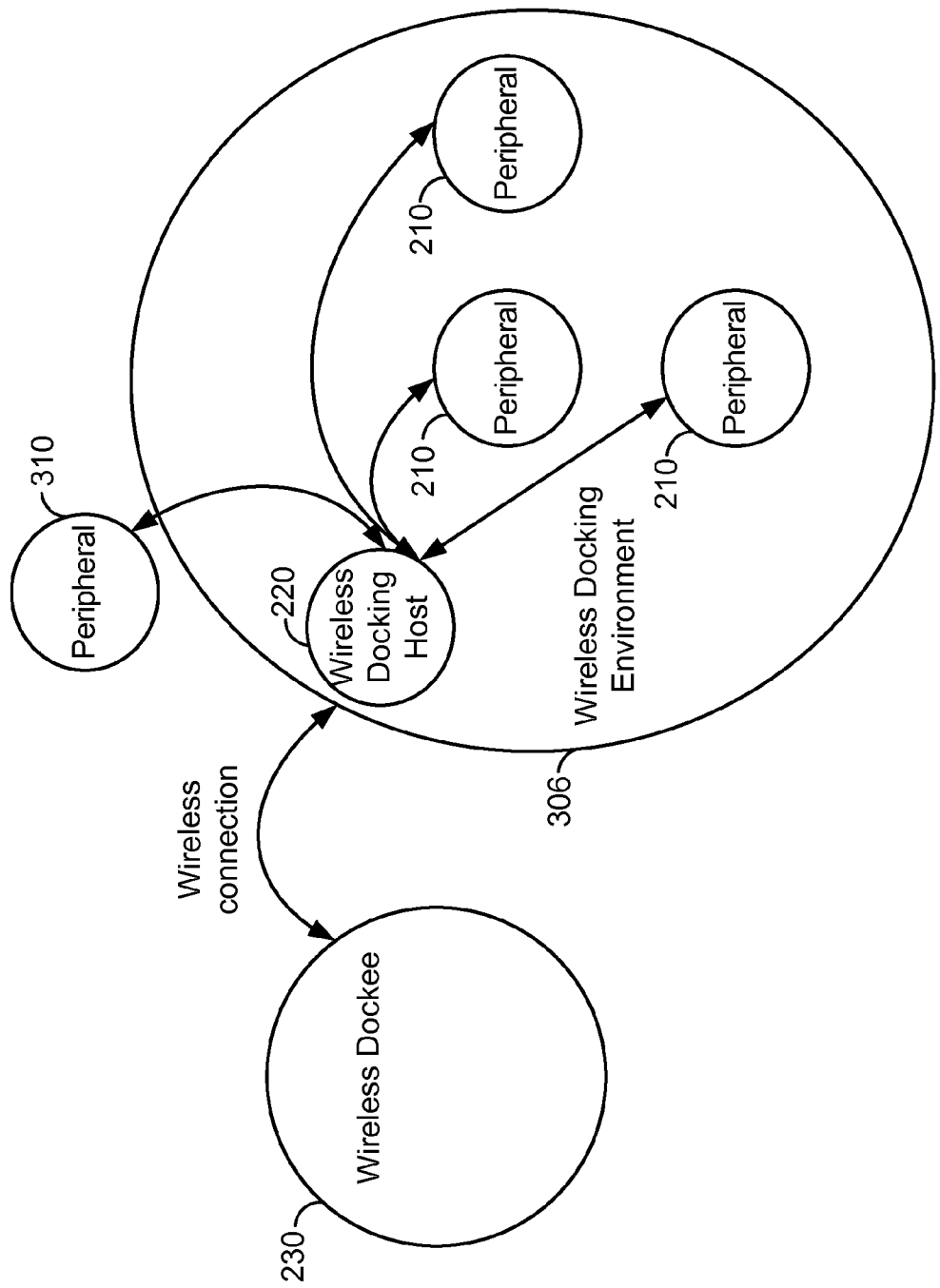
FIG. 3 is a simplified schematic diagram of a wireless docking system utilizing a conventional wireless docking environment.

A conventional wireless docking system may provide a wireless connection between a wireless dockee and a wireless docking environment. FIG. 3 is a simplified schematic diagram that illustrates a conventional wireless docking system 300 including a dockee 230 in wireless communication with a plurality of peripherals 210, 310 by way of a wireless docking host 220, as a part of a wireless docking environment 306.

The dockee 230 may be any suitable device capable of wirelessly connecting to the wireless docking environment 306 utilizing any suitable communication protocol, which may include but is not limited to IEEE 802.11 "Wi-Fi." By connecting to the wireless docking environment 306, the dockee 230 may be capable of connecting directly or indirectly to each of the peripherals 210 that are part of the wireless docking environment 306.

The wireless docking environment 306 is a group of one or more physical devices, including one or more wireless docking hosts 220 and one or more peripherals 210. A wireless docking environment 306 can take any suitable configuration or topology, for example, including nothing more than a wireless docking host 220, or additionally including one or more peripherals 210.

The peripherals 210 may represent logical peripheral functions. In general, a peripheral function may be any I/O function implemented in a wireless docking host 220 that can be made available to a wireless dockee 230 through any of various suitable wireless interfaces; any I/O function in an external peripheral device that can be made available to the wireless dockee 230 through the wireless docking host 220, where the external peripheral device may be directly connected to the wireless docking host 220; or any I/O function in an external peripheral device that can be connected directly to the wireless dockee 230, and whose connection to the wireless dockee 230 is set up utilizing information provided by the wireless docking host 220. Peripherals 210 may in some examples be embodied as physical devices having wired and/or wireless interfaces for communicating with the wireless dockee 230 through the wireless docking host 220. Some nonlimiting examples of peripherals might include monitors or displays, speakers, microphones, keyboards, mouse, cameras, speakers, media servers, sensors, printers, scanners, mass storage devices, USB interfaces, Ethernet interfaces, etc.

In the illustration, some peripherals 210 are shown in the wireless docking environment 306, and an extra peripheral 310 is shown outside the wireless docking environment 306. Here, this extra peripheral 310 illustrates that not necessarily all peripherals 210, 310 that are paired with the wireless docking host 220 are included in a particular wireless docking environment 306. That is, a wireless docking environment 306 associated with a wireless docking host 220 may include only a subset of the peripherals 210, 310 that are paired with, or in communication with the docking host 220. Moreover, the extra peripheral 310 may be one of numerous extra peripherals 310, and further, the wireless docking host may provide a plurality of wireless docking environments such as the environment 306. Here, the set of peripherals in a particular wireless docking environment may include any number, from zero or greater, of peripherals, and further, in some examples, a particular peripheral 210, 310 may be included in zero, one, two, or more established wireless docking environments 306.

The wireless docking host 220 may be any suitable device capable of connecting to the wireless dockee 230 and one or more peripherals 210. For example, a wireless docking host 220 may make available to a wireless dockee 230 peripheral functions on external peripherals 210 that are connected to the docking host 220 directly, as well as peripheral functions the wireless docking host 220 itself may implement (e.g., a display).

The docking host 220 may provide different docking experiences or docking environments 306 to different dockees 230. For example, at a given time a dockee 230 may have a particular need for certain peripheral functions, and upon learning of this need, the docking host 220 may therefore provide a corresponding docking environment 306 for that dockee.

One example of a way for a docking host to provide these capabilities to different dockees is for the docking host to preconfigure multiple docking environments. That is, multiple groups of peripherals can be preconfigured at the docking host, e.g., by randomly selecting groups of available peripherals or by selecting certain peripherals to be grouped together. Here, each group may be a logical group including suitable peripherals, which may be manually or automatically configured with the docking host.

In this example, the docking host may group its attached and/or wirelessly paired peripherals into multiple hierarchical groups and enable each dockee to use one group. For example, assume that a particular docking host has peripherals A-G available. Here, peripherals A, B, and C may be grouped together into a first group, and peripherals D, E, F, and G may be grouped together into a second group. This way, the groups may be disjoint groups of peripherals. In another example, peripherals A, B, and C may be grouped together into a first group, and peripherals C, D, and E may be grouped together into a second group. This way, the groups may have some intersection or overlap of peripherals.

With a hierarchical grouping, separate groups of peripherals might be disjoint groups, and separate groups might have a common parent. For the common parent, peripherals A, B, C, D, E, and F might be a parent group in the hierarchy, and at the next level of the hierarchy, groups might include, for example, peripherals A, B, and C as a first group; and peripherals D, E, and F as a second group. By utilizing such groups of peripherals, each such group can be considered a separate wireless docking environment 306 as discussed above. That is, a particular wireless docking host 220 may be capable of providing any from a plurality of wireless docking environments 306 to a particular wireless dockee 230, each wireless docking environment 306 including a different group of peripherals that may be one of a plurality of pre-configured hierarchical groups.

This paradigm results in relatively complex standardization requirements for specifying docking environments and air interfaces to identify and choose different docking environments. For example, the docking host is generally required to establish a protocol to communicate with its available peripherals and group those peripherals in a specific manner. Further, once the groups are configured, the docking host must express the groups over the air to communicate to potential dockees what peripherals are available in each docking environment, and a particular docking environment must then be selected. When no particular group is satisfactory to a dockee, additional protocols may be created to re-group the peripherals in a more suitable fashion if possible. Moreover, this paradigm creates a complex mental picture for a user of the dockee device to manage its docking host and docking environment.

Docking Profile

Thus, in accordance with various aspects of the present disclosure, rather than utilizing these preconfigured docking environments 306 as described above, a wireless docking host 220 may implement various standardized docking profiles, each docking profile including a standardized minimum set of peripherals corresponding to a particular (e.g., pre-configured) use case. That is, a docking profile may provide a standardized set of requirements to facilitate a minimum level of interoperability (MLI) for a typical docking use case, specified, for example, as a list of peripherals, their peripheral function protocols, and their payload connection protocols.

In this manner, a common set of docking profiles can be known across wireless docking systems, whereby it is known both to dockees 230 and to docking hosts 220 what is meant, i.e., a minimum set of peripherals that are included, by an indication of a particular docking profile. This way, vendors of docking equipment can be enabled to utilize the standardized set of docking profiles, thereby simplifying the docking procedure between the dockee 230 and the docking host 220. That is, when such standardized or specified docking profiles are utilized by the dockees 230 and the docking hosts 220, it may increase the likelihood that a particular grouping of peripherals 210 is useful to dockees 230.

By using such docking profiles, a dockee 230 need not perceive the notion of multiple docking environments 306 made available by the docking host 220. Rather, in an aspect of the disclosure, the dockee 230 may simply transmit a request for a standardized docking profile, or in another example, the docking host 220 can advertise one or more available docking profiles available for use by dockees 230. In another example, the dockee 230 may request the docking host 220 to transmit a list of peripherals 210 that the dockee 230 can choose to utilize.

In addition to a list of peripheral devices indicating a minimum set of devices to qualify as a particular docking profile, in a further aspect of the disclosure a docking profile may include protocols and/or connection types for communication between the docking host 220 and peripherals 210. For example, wireless display, Wi-Fi serial bus, WiGig, Bluetooth, frequency channels, data rates, HDMI, VGA, DVI, USB, 3.5 mm audio jacks, Ethernet, embedded protocols, etc.

In a further aspect of the disclosure, a docking profile may include a suitable access privilege level for a dockee 230 that engages in a docking session utilizing that docking profile, such as a public mode, a private mode, and a managed mode. That is, the selected docking profile may connect between the docking host 220 and the dockee 230 utilizing one selected from a plurality of different modes that can affect security and administration of the docking profile settings.

For example, the public mode might be utilized for ad-hoc and mobile users, so that those users can connect to a docking profile to utilize shared docking hosts. The public mode may be enabled to allow a partial, limited access to docking host functionality to visitors.

Further, the private mode might be utilized for residential users to connect to the docking profile to utilize the home docking host. The private mode may allow full access to docking host functionality, e.g., for owners of the docking host, and their family.

Further, the managed mode might be utilized for enterprise users to connect to the docking profile to utilize corporate docking hosts. The managed mode may allow managed access to docking host functionality, e.g., to be managed by a system administrator.

FIGS. 4-8 illustrate some nonlimiting examples of docking profiles according to various aspects of the present disclosure. These illustrations are examples of profile structures that would be understood by the various entities in a wireless docking system defining the minimum requirements for a particular profile. In each illustration, bold text is utilized to illustrate one possibility for a minimum requirement for each category, while the un-bold text may be additional options within that profile. Along the left of each illustration, the type or category of peripheral is listed, and along the top is listed various aspects of each listed peripheral, including the peripheral function, a payload connection protocol, and the dock interface. Of course, those skilled in the art will comprehend that these listed profiles are merely exemplary in nature, and in an implementation within the scope of the present disclosure, any subset of the listed profiles may be available, and/or additional or different profiles not listed explicitly herein may be available. In a further aspect of the disclosure, docking profiles may include one or more sub-profiles having different minimum requirements.

For example, FIG. 4 illustrates an exemplary desktop or office profile, which may include standard personal computer or workstation functionality by including as a minimum standard set of peripherals a monitor, mouse, keyboard, speakers, a mass storage device, and an Internet communication interface. In the illustration, additional peripherals may be included in the desktop profile, as supplemental but not required to meet the definition of the desktop profile, including such peripherals as a gamepad, a microphone/headset, a printer, an IP camera, and/or a media server.

FIG. 5 illustrates an exemplary dashboard or automotive profile, which may include standard automobile or other integrated component functionality by including as a minimum standard set of peripherals a display, a dash touchscreen, OBU controls, speakers, a mass storage device, and an Internet communication interface. In the illustration, additional peripherals may be included in the desktop profile, as supplemental but not required to meet the definition of the desktop profile, including such peripherals as console buttons, a microphone/headset, sensors, meters, cameras, other USB interfaces, IP cameras, and/or a media server.

FIG. 6 illustrates an exemplary collaboration profile, which may include standard functionality for conference room or other areas with conference and device sharing by including as a minimum standard set of peripherals a projector, a large shared monitor, a human input, a multi-mouse, a multi-keyboard, speakers, a video teleconference center (VTC), a telepresence device, a security camera, and an Internet communication interface. In the illustration, additional peripherals may be included in the desktop profile, as supplemental but not required to meet the definition of the desktop profile, including such peripherals as a web feed, multi microphones/headsets, IP cameras or web cameras, and/or a media server.

FIG. 7 illustrates an exemplary home entertainment profile, which may range from a simple alarm clock to a sophisticated entertainment system, e.g., being distributed to enable a choice of displays and speakers across a house. Here, a minimum standard set of peripherals may include a television or monitor, a remote control, a gamepad, speakers, a mass storage device, a camera, and an Internet communication interface. In the illustration, additional peripherals may be included in the entertainment profile, as supplemental but not required to meet the definition of the desktop profile, including such peripherals as a mouse, a keyboard, a microphone/headset, various serial devices, a streaming video device, an IP camera, and/or a media server.

FIG. 8 illustrates an exemplary machine-to-machine (M2M) control profile, which may include automated home control for lighting, power scheduling, appliances, etc., e.g., being distributed to enable choices of devices around the house. Here, a minimum standard set of peripherals may include a monitor, a mouse, a keyboard, a mass storage device, and an Internet communication interface. In the illustration, additional peripherals may be included in the M2M profile, as supplemental but not required to meet the definition of the desktop profile, including such peripherals as a control pad, various custom serial devices, an IP camera, and/or a device manager.

Docking Procedure

As described above, by utilizing docking profiles, the procedure for establishing a docking session can be simplified as compared to the conventional procedure for setting up a docking session utilizing a docking environment. That is, by removing the notion of the predetermined docking environments and instead utilizing the docking profile as described above, a docking host 220 may configure different groups of peripherals 210 for a dockee 230 to use. The docking host 220 can perform the grouping based on standardized docking profiles or based on user demands. In this way, the dockee 230 need not perceive the notion of multiple docking environments at a docking host 220. Rather, a dockee 230 may simply request a standardized docking profile to use, or may ask the docking host 220 to provide a list of peripherals 210 that it can choose to use.

Figure 9:
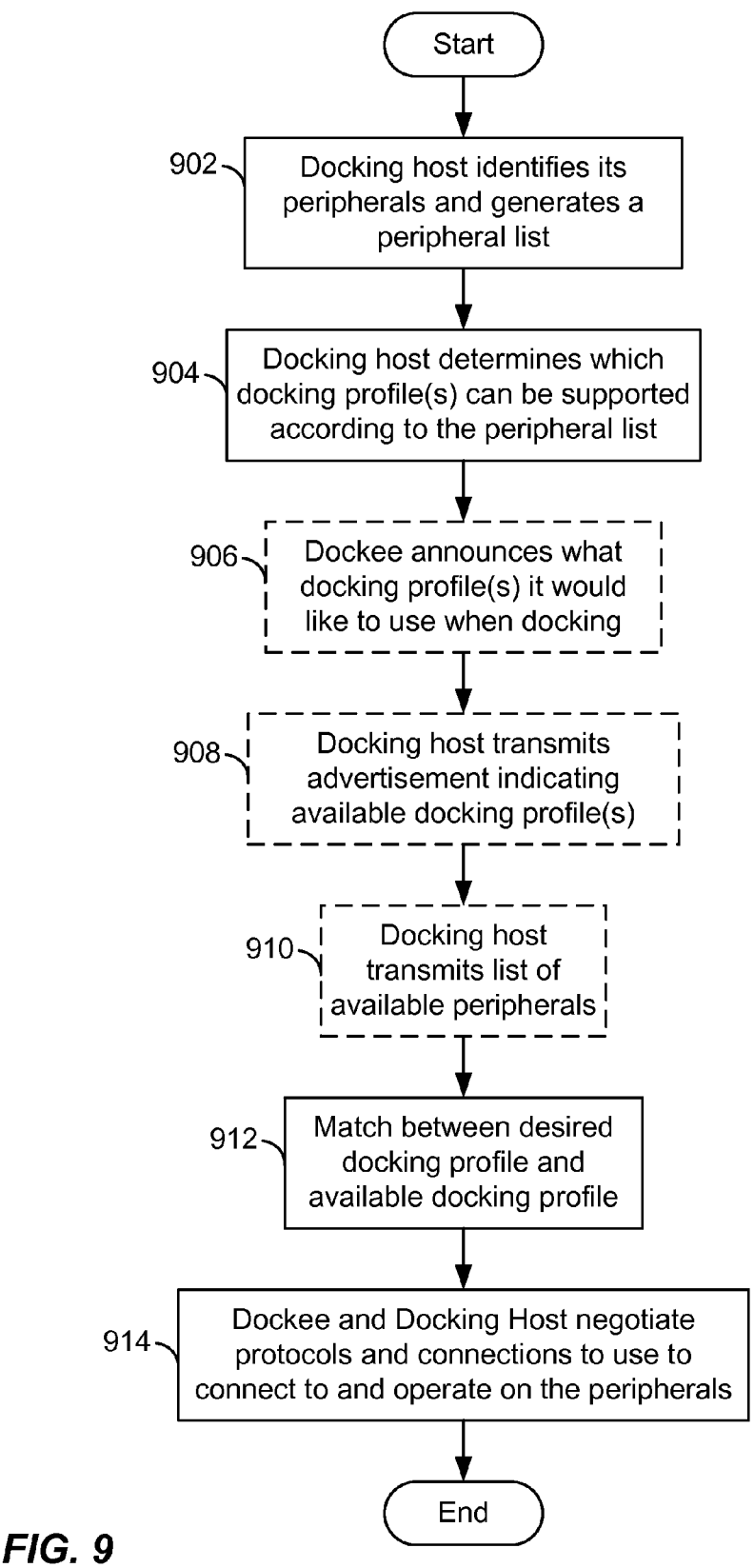
FIG. 9 is a flow chart illustrating an exemplary process of establishing a docking connection between a dockee and a docking host utilizing a docking profile according to one example.

FIG. 9 is a flow chart illustrating an exemplary process 900 of establishing a docking session in accordance with an aspect of the disclosure. As will be described in further detail below, portions of the process 900 may be operable at the dockee 230 and/or at the docking host 220.

At step 902, the docking host 220 may generate a list of paired peripherals. Here, the generation of the peripheral list may be performed periodically, intermittently, or in response to any suitable trigger or condition. For example, one trigger for the generation of a peripheral list may be the reception of a request for a docking session from a dockee 230, or the reception of a request for a particular docking profile from the dockee 230. In another example, the peripheral list may be re-generated when a new peripheral 210 is paired or coupled with the docking host 220, or when a peripheral 210 is un-paired from the docking host 220. In a further example, when a dockee 230 requests a docking profile advertised as available at a docking host 220, the docking host 220 can at that time dynamically create such a group of peripherals for the dockee 230 to use. Later, when a different dockee 230 contacts the docking host 220 and requests the same profile, the docking host 220 may check against a peripheral list, and if the peripherals are no longer available it may indicate that that docking profile is not available.

That is, at the docking host 220, a list of peripherals 210 may include an indication as to whether each peripheral 210 is being utilized by a dockee 230, such that the availability of a docking profile may change with respect to subsequent dockee requests.

In some aspects of the disclosure, a particular entry in a peripheral list may be exclusive to a single dockee 230. For example, a mouse might be exclusive to one dockee 230, as it is generally not a device that can be shared by multiple users. However, in some aspects of the disclosure, a particular entry in a peripheral list may need not be exclusive to a single dockee 230, and can be shared by a plurality of dockees 230. For example, a peripheral device such as a wireless printer need not be exclusive to a particular dockee 230. As another example, a communication protocol or interface may need not be exclusive to a particular dockee 230, such as when the docking host 220 might enable an Ethernet connection to communicate with the Internet, might be shared with a plurality of dockees 230.

To generate the peripheral list, the docking host 220 may generate a list of wireline connected peripherals, wirelessly paired peripherals, and/or available peripheral functions. With the list of peripherals, at 904 the docking host 220 can generate a list of profiles that may be available for use in a docking session. Here, the docking host 220 may compare the generated peripheral list to a set of standardized docking profiles. That is, the docking host 220 may have stored in memory 223 a set of docking profiles, each stored docking profile including a minimum set of peripherals that must be available to the docking host 220 in order to utilize that docking profile. If at least that minimum set of peripherals is included in the generated peripheral list, the docking host 220 may then determine that the corresponding docking profile is available. In this way, at step 904, the docking host 220 can generate a list of profiles that may be available for use in a docking session.

In some examples, a dockee 230 may request a particular docking profile, while in some examples the docking host 220 may advertise what docking profiles it can support. That is, the docking host 220 might create a grouping of peripherals 210 to meet the minimum set of peripherals corresponding to a requested docking profile, or the docking host 220 might create groupings of peripherals 210 and transmit which docking profiles have their minimum requirements met by the available peripherals 210. Thus, in some examples, steps 906 and 908 may be utilized together, or in other examples, only one or the other of steps 906 or 908 may be utilized.

At step 906, the dockee 230 may announce to the docking host 220 one or more docking profiles that it would like to utilize in a docking session, e.g., by transmitting information corresponding to one or more docking profiles to the docking host 220. Here, the dockee may utilize information corresponding to the same standardized docking profiles known to the docking host, so that the announcement of one or more docking profiles is understood by the docking host to correspond to a particular minimum set of peripherals. In this case, the request transmitted by the dockee 230 may trigger a response from the docking host 220, in which the docking host 220 determines whether the requested docking profile is available, and in some examples, transmits a response to the dockee 230 indicating whether the requested docking profile is available.

On the other hand, in some aspects of the disclosure, if the dockee 230 does not have a specific docking profile it intends to use, the dockee 230 may simply wait and see what peripherals 210 a docking host 220 will offer during a negotiation process. That is, in addition to or in the alternative to responding to a dockee's announcement of desired docking profiles, the docking host 220 may transmit a list identifying peripherals 210 it has available. That is, when a docking host 220 sees a dockee 230 that seeks to dock without indicating a specific docking profile, the docking host 220 may first present all its peripherals 210 and necessary peripheral details such as available protocols and connections to use to the dockee.

At step 908, the docking host may transmit an advertisement or announcement of one or more available docking profiles for use by the dockee 230, e.g., by transmitting information corresponding to a set of supported docking profiles. For example, the advertisement herein may be periodically or intermittently broadcasted by the docking host 220 to make this information available for dockees 230, or in other examples, the advertisement may be transmitted in response to a request from the dockee 230.

In some aspects of the disclosure, when the docking host 220 advertises over the air it may indicate the list of supported docking profiles, and/or as indicated at step 910 it may indicate a list of peripherals available for utilization. For example, if a docking profile requested by the dockee 230 is not among the list of docking profiles available at the docking host 220, transmission of this list of peripherals 210 can enable a docking session to be established utilizing selected peripherals. In addition, even if a requested docking profile is available and selected, the transmission of the list of peripherals can provide additional flexibility, as the user can select individual peripherals 210 in addition to or instead of selecting a docking profile.

Based on the above communication between the docking host 220 and dockee 230, at step 912 one or both of the docking host 220 and/or the dockee 230 may determine whether a match exists between the docking profile desired by the dockee 230 and a docking profile available at the docking host 220. If such a match exists, the docking host 220 may confirm to the dockee 230 that the desired profile is available, for example by transmitting a suitable indication message to the dockee 230. Here, the docking host 220 may further present to the dockee 230 any necessary peripheral details, such as available protocols and connections to use.

In some examples, the docking host 220 may present options to the dockee 230 if more than one peripheral 210 might be utilized to meet a specific requirement for a docking profile. For example, if two or more different types of mouse, or different types of communication protocols, are available. In another example, the docking host 220 may be configured to select among the available options for the dockee 230. That is, if multiple peripherals that meet a specific requirement for the selected docking profile, the docking host make the selection for the dockee 230.

The dockee 230 then may choose to accept the peripherals 210 provided by the docking host 220 and, when feasible, negotiate with the docking host the protocols and connections it may wish to use to connect to and operate on the peripherals.

Several aspects of a wireless docking system have been presented with reference to a system utilizing IEEE 802.11 "Wi-Fi" communication protocols. As those skilled in the art will readily appreciate, various aspects described throughout this disclosure may be extended to other communication systems, network architectures and communication standards. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method operable at a docking host for docking with a dockee, the method comprising:
   generating a peripheral list by listing at least wireline connected peripherals that are currently connected by wireline to the docking host, and wirelessly paired peripherals that are currently paired with the docking host;
   determining one or more supported docking profiles capable of being supported by the peripheral list, by comparing the peripheral list with a set of stored docking profiles, each docking profile in the set of stored docking profiles comprising a minimum set of peripherals corresponding to a pre-configured use case;
   transmitting an indication of the one or more supported docking profiles to the dockee; and
   docking with the dockee, the dockee to utilize a set of one or more of the peripherals communicatively coupled to the docking host and corresponding to one of the supported docking profiles.

2. The method of claim 1, wherein the docking with the dockee comprises selecting for the docking one of a public mode, a private mode, or a managed mode,
   wherein the public mode is a docking mode adapted for limiting access to docking host functionality,
   wherein the private mode is a docking mode adapted for providing full access to the docking host functionality, and
   wherein the managed mode is a docking mode adapted for providing managed access to the docking host functionality.

3. The method of claim 1, wherein the generating the peripheral list further comprises listing peripheral functions implemented by the docking host.

4. A method operable at a docking host for docking with a dockee, the method comprising:
   receiving, from the dockee, an indication of one or more requested docking profiles, each of the one or more requested docking profiles comprising a minimum set of peripherals corresponding to a pre-configured use case;
   generating a list of one or more supported docking profiles capable of being supported by at least wireline connected peripherals that are currently connected by wireline to the docking host, and wirelessly paired peripherals that are currently paired with the docking host;
   comparing the one or more requested docking profiles to the list of one or more supported docking profiles; and
   docking with the dockee, the dockee to utilize a set of one or more of the peripherals communicatively coupled to the docking host and corresponding to one of the supported docking profiles.

5. The method of claim 3, wherein the generating the list of one or more supported docking profiles further comprises generating the list of one or more supported docking profiles capable of being supported further by peripheral functions implemented by the docking host.

6. A method operable at a docking host for docking with a dockee, the method comprising:
   receiving, from the dockee, an indication of one or more requested docking profiles, each of the one or more requested docking profiles comprising a minimum set of peripherals corresponding to a pre-configured use case;
   generating a list of one or more supported docking profiles capable of being supported by at least wireline connected peripherals that are currently connected by wireline to the docking host, and wirelessly paired peripherals that are currently paired with the docking host;
   comparing the one or more requested docking profiles to the list of one or more supported docking profiles;
   determining that none of the one or more requested docking profiles appear in the list of one or more supported docking profiles; and
   transmitting a list of one or more available peripherals to the dockee.

7. The method of claim 6, further comprising:
   docking with the dockee utilizing a docking environment comprising one or more peripherals from among the transmitted list of one or more available peripherals.

8. The method of claim 6, wherein the generating the list of one or more supported docking profiles further comprises generating the list of one or more supported docking profiles capable of being supported further by peripheral functions implemented by the docking host.

9. A docking host configured for docking with a dockee, the docking host comprising:
   means for generating a peripheral list by listing at least wireline connected peripherals that are currently connected by wireline to the docking host, wirelessly paired peripherals that are currently paired with the docking host;

means for determining one or more supported docking profiles capable of being supported by the peripheral list, by comparing the peripheral list with a set of stored docking profiles, each docking profile in the set of stored docking profiles comprising a minimum set of peripherals corresponding to a pre-configured use case;

means for transmitting an indication of the one or more supported docking profiles to the dockee; and means for docking with the dockee, the dockee to utilize a set of one or more of the peripherals communicatively coupled to the docking host and corresponding to one of the supported docking profiles.

10. The docking host of claim 9, wherein the means for docking with the dockee is configured to select for the docking one of a public mode, a private mode, or a managed mode, wherein the public mode is a docking mode adapted for limiting access to docking host functionality, wherein the private mode is a docking mode adapted for providing full access to the docking host functionality, and wherein the managed mode is a docking mode adapted for providing managed access to the docking host functionality.

11. The docking host of claim 9, wherein the means for generating the peripheral list is further configured for listing peripheral functions implemented by the docking host.

12. A docking host configured for docking with a dockee, the docking host comprising:

means for receiving, from the dockee, an indication of one or more requested docking profiles, each of the one or more requested docking profiles comprising a minimum set of peripherals corresponding to a pre-configured use case;

means for generating a list of one or more supported docking profiles capable of being supported by at least wireline connected peripherals that are currently connected by wireline to the docking host, and wirelessly paired peripherals that are currently paired with the docking host;

means for comparing the one or more requested docking profiles to the list of one or more supported docking profiles; and means for docking with the dockee, the dockee to utilize a set of one or more of the peripherals communicatively coupled to the docking host and corresponding to one of the supported docking profiles.

13. The docking host of claim 12, wherein the means for generating the list of one or more supported docking profiles is further configured for generating the list of one or more supported docking profiles capable of being supported further by peripheral functions implemented by the docking host.

14. A docking host configured for docking with a dockee, the docking host comprising:

means for receiving, from the dockee, an indication of one or more requested docking profiles, each of the one or more requested docking profiles comprising a minimum set of peripherals corresponding to a pre-configured use case;

means for generating a list of one or more supported docking profiles capable of being supported by at least wireline connected peripherals that are currently connected by wireline to the docking host, and wirelessly paired peripherals that are currently paired with the docking host;

means for comparing the one or more requested docking profiles to the list of one or more supported docking profiles;

means for determining that none of the one or more requested docking profiles appear in the list of one or more supported docking profiles; and means for transmitting a list of one or more available peripherals to the dockee.

15. The docking host of claim 14, further comprising:

means for docking with the dockee utilizing a docking environment comprising one or more peripherals from among the transmitted list of one or more available peripherals.

16. The docking host of claim 14, wherein the means for generating the list of one or more supported docking profiles is further configured for generating the list of one or more supported docking profiles capable of being supported further by peripheral functions implemented by the docking host.

17. A docking host configured for docking with a dockee, the docking host comprising:

at least one processor;

a transceiver communicatively coupled to the at least one processor; and a memory communicatively coupled to the at least one processor, wherein the at least one processor is configured to:

generate a peripheral list by listing at least wireline connected peripherals that are currently connected by wireline to the docking host, and wirelessly paired peripherals that are currently paired with the docking host;

determine one or more supported docking profiles capable of being supported by the peripheral list, by comparing the peripheral list with a set of stored docking profiles, each docking profile in the set of stored docking profiles comprising a minimum set of peripherals corresponding to a pre-configured use case;

transmit an indication of the one or more supported docking profiles to the dockee; and dock with the dockee, the dockee to utilize a set of one or more of the peripherals communicatively coupled to the docking host and corresponding to one of the supported docking profiles.

18. The docking host of claim 17, wherein the at least one processor, being configured to dock with the dockee, is further configured to select for the docking one of a public mode, a private mode, or a managed mode, wherein the public mode is a docking mode adapted for limiting access to docking host functionality, wherein the private mode is a docking mode adapted for providing full access to the docking host functionality, and wherein the managed mode is a docking mode adapted for providing managed access to the docking host functionality.

19. The docking host of claim 17, wherein the at least one processor, being configured to generate the peripheral list, is further configured to list peripheral functions implemented by the docking host.

20. A docking host configured for docking with a dockee, the docking host comprising:

at least one processor;

a transceiver communicatively coupled to the at least one processor; and
a memory communicatively coupled to the at least one processor,
wherein the at least one processor is configured to:
receive, from the dockee, an indication of one or more requested docking profiles, each of the one or more requested docking profiles comprising a minimum set of peripherals corresponding to a pre-configured use case;
generate a list of one or more supported docking profiles capable of being supported by at least wireline connected peripherals that are currently connected by wireline to the docking host, and wirelessly paired peripherals that are currently paired with the docking host;
compare the one or more requested docking profiles to the list of one or more supported docking profiles; and
dock with the dockee, the dockee to utilize a set of one or more of the peripherals communicatively coupled to the docking host and corresponding to one of the supported docking profiles.

21. The docking host of claim 20, wherein the at least one processor, being configured to generate the list of one or more supported docking profiles, is further configured to generate the list of one or more supported docking profiles capable of being supported further by peripheral functions implemented by the docking host.

22. A docking host configured for docking with a dockee, the docking host comprising:
at least one processor;
a transceiver communicatively coupled to the at least one processor; and
a memory communicatively coupled to the at least one processor,
wherein the at least one processor is configured to:
receive, from the dockee, an indication of one or more requested docking profiles, each of the one or more requested docking profiles comprising a minimum set of peripherals corresponding to a pre-configured use case;
generate a list of one or more supported docking profiles capable of being supported by at least wireline connected peripherals that are currently connected by wireline to the docking host, and wirelessly paired peripherals that are currently paired with the docking host;
compare the one or more requested docking profiles to the list of one or more supported docking profiles;
determine that none of the one or more requested docking profiles appear in the list of one or more supported docking profiles; and
transmit a list of one or more available peripherals to the dockee.

23. The docking host of claim 22, wherein the at least one processor is further configured to dock with the dockee utilizing a docking environment comprising one or more peripherals from among the transmitted list of one or more available peripherals.

24. The docking host of claim 22, wherein the at least one processor, being configured to generate the list of one or more supported docking profiles, is further configured to generate the list of one or more supported docking profiles capable of being supported further by peripheral functions implemented by the docking host.

25. A non-transitory computer-readable storage medium, comprising instructions for causing a computer to:
generate a peripheral list by listing at least wireline connected peripherals that are currently connected by wireline to the docking host, and wirelessly paired peripherals that are currently paired with the docking host;
determine one or more supported docking profiles capable of being supported by the peripheral list, by comparing the peripheral list with a set of stored docking profiles, each docking profile in the set of stored docking profiles comprising a minimum set of peripherals corresponding to a pre-configured use case;
transmit an indication of the one or more supported docking profiles to a dockee; and
dock with the dockee, the dockee to utilize a set of one or more of the peripherals communicatively coupled to the docking host and corresponding to one of the supported docking profiles.

26. The non-transitory computer-readable storage medium of claim 25, wherein the instructions for causing the computer to dock with the dockee are further configured to cause the computer to select for the docking one of a public mode, a private mode, or a managed mode,
wherein the public mode is a docking mode adapted for limiting access to docking host functionality,
wherein the private mode is a docking mode adapted for providing full access to the docking host functionality, and
wherein the managed mode is a docking mode adapted for providing managed access to the docking host functionality.

27. A non-transitory computer-readable storage medium, comprising instructions for causing a computer to:
receive, from a dockee, an indication of one or more requested docking profiles, each of the one or more requested docking profiles comprising a minimum set of peripherals corresponding to a pre-configured use case;
generate a list of one or more supported docking profiles capable of being supported by at least wireline connected peripherals that are currently connected by wireline to the docking host, and wirelessly paired peripherals that are currently paired with the docking host;
compare the one or more requested docking profiles to the list of one or more supported docking profiles; and
dock with the dockee, the dockee to utilize a set of one or more of the peripherals communicatively coupled to a docking host and corresponding to one of the supported docking profiles.

28. A non-transitory computer-readable storage medium, comprising instructions for causing a computer to:
receive, from a dockee, an indication of one or more requested docking profiles, each of the one or more requested docking profiles comprising a minimum set of peripherals corresponding to a pre-configured use case;
generate a list of one or more supported docking profiles capable of being supported by at least wireline connected peripherals that are currently connected by wireline to the docking host, and wirelessly paired peripherals that are currently paired with the docking host compare the one or more requested docking profiles to the list of one or more supported docking profiles;

determine that none of the one or more requested docking profiles appear in the list of one or more supported docking profiles; and transmit a list of one or more available peripherals to the dockee.

29. The non-transitory computer-readable storage medium of claim 28, further comprising instructions for causing the computer to dock with the dockee utilizing a docking environment comprising one or more peripherals from among the transmitted list of one or more available peripherals.

* * * * *